United States Patent [19]

Reiter et al.

[11] 4,384,061
[45] May 17, 1983

[54] THERMOSETTING POLYCONDENSATES CONTAINING AMIDE AND IMIDE GROUPS, AND THEIR USE

[75] Inventors: Udo Reiter, Mutterstadt; Helmut Lehmann, Reinbek; Walter Disteldorf; Hans-Uwe Schenck, both of Wachenheim, all of Fed. Rep. of Germany

[73] Assignee: BASF Aktiengesellschaft, Fed. Rep. of Germany

[21] Appl. No.: 304,269

[22] Filed: Sep. 21, 1981

[30] Foreign Application Priority Data

Oct. 2, 1980 [DE] Fed. Rep. of Germany ....... 3037269

[51] Int. Cl.³ .......................... C08K 5/34; C08L 79/08
[52] U.S. Cl. .................................... 524/104; 428/378; 428/379; 524/233; 524/600; 524/845; 525/926; 525/928; 528/342; 528/353
[58] Field of Search ................. 260/29.2 N; 524/104, 524/233, 600, 845; 525/926, 928; 528/342, 353

[56] References Cited

U.S. PATENT DOCUMENTS 3,471,444 10/1969 Sherer et al. ........................ 260/65
3,894,114 7/1975 Lohmann et al. ............ 260/857 PA
4,008,195 2/1977 Ishizuka et al. ............... 260/29.2 N

FOREIGN PATENT DOCUMENTS 2651194 5/1978 Fed. Rep. of Germany .
2434176 8/1979 Fed. Rep. of Germany .

*Primary Examiner*—Theodore E. Pertilla
*Attorney, Agent, or Firm*—Keil & Witherspoon

[57] ABSTRACT

Thermosetting polycondensates containing amide and imide groups which are obtained by reacting 1,2,3,4-butanetetracarboxylic acid or its anhydride with one or more aliphatic, cycloaliphatic or aromatic diamines and one or more oxadicarboxylic acids or oxadicarboxylic acid esters of the general formula

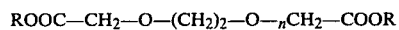
$$ROOC-CH_2-O-(CH_2)_2-O-_nCH_2-COOR$$

where R is hydrogen or alkyl of 1 to 6 carbon atoms and n is 0 or an integer from 1 to 10, in a water-soluble organic solvent and/or water, at from 80° to 200° C. These polycondensates are useful as wire enamels, impregnating agents and adhesives.

3 Claims, No Drawings

THERMOSETTING POLYCONDENSATES CONTAINING AMIDE AND IMIDE GROUPS, AND THEIR USE

The present invention relates to thermosetting polycondensates containing amide and imide groups, and to their use as wire enamels, impregnating agents and adhesives.

The preparation of polyimide starting materials from butanetetracarboxylic acid (=BTC) and diamines in, for example, triglycol and ethylene glycol/water has been disclosed, for example in German Published Application DAS No. 2,434,176. Under these conditions, not only does BTC react with the diamine, but the acid also partially undergoes esterification.

After applying such polycondensates, for example in the form of solutions or aqueous dispersions (for instance as described in German Laid-Open Application DOS No. 2,651,194) onto the substrate to be coated, for example, copper wire, baking results in the elimination of triglycol or of other glycols linked by ester bonds to the precondensate.

To achieve good resilience of the enamel, it is essential that a proportion of the glycol remains in the polymer; on the other hand, excessive amounts of glycol very substantially lower the heat resistance. Accordingly, in wire enamelling it is necessary to achieve a compromise as regards baking time.

Since the residence time of coated wire in the baking oven is controlled by the haul-off speed, the latitude in operating conditions is very small, ie. very good results in respect of technical properties are only achievable over a narrow speed range. If precondensate resins are produced entirely without triglycol and copper wire is enamelled with solutions prepared therefrom, the coatings obtained are entirely unusable.

It is an object of the present invention to provide polycondensates by means of which the above disadvantages are avoided and coatings are obtainable which have both a high softening point and high resilience.

We have found that this object is achieved, surprisingly, by incorporating oxadicarboxylic acids into the polycondensates.

Accordingly, the present invention relates to thermosetting polycondensates, containing amide groups and imide groups, which polycondensates are obtained by reacting (a) 1,2,3,4-butanetetracarboxylic acid or its anhydride with
(b) one or more aliphatic, cycloaliphatic or aromatic diamines and
(c) one or more oxadicarboxylic acids or oxadicarboxylic acid esters of the general formula

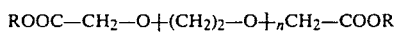

ROOC—CH$_2$—O+(CH$_2$)$_2$—O+$_n$CH$_2$—COOR where R is hydrogen or an alkyl of 1 to 6 carbon atoms and n is 0 or an integer from 1 to 10, in a water-soluble organic solvent and/or water at from 80° and 200° C., the components (a), (b) and (c) being employed in a molar ratio of (b):(a):(c)=1:(0.6–1):(0.1–0.6).

The present invention further relates to solutions of the novel polycondensates in polar organic solvents, eg. N-methylpyrrolidone, dimethylformamide or dimethylacetamide, to aqueous preparations of the polycondensates, converted to a water-dilutable form by addition of ammonia or organic amines, and to the use of the thermosetting polycondensates as wire enamels, impregnating agents and adhesives.

The novel polycondensates have very advantageous processing characteristics. They give enamel coatings, impregnations and adhesive bonds which have a high softening point (up to 450° C.) and high resilience.

The following details may be noted in respect of the components from which the novel thermosetting polycondensates are synthesized:

(a) This component is 1,2,3,4-butanetetracarboxylic acid, 1,2,3,4-butanetetracarboxylic acid monoanhydride or 1,2,3,4-butanetetracarboxylic acid dianhydride, the acid being preferred.

(b) This component is a primary, aliphatic, cycloaliphatic or aromatic diamine. Examples of suitable aliphatic diamines are straight-chain or branched aliphatic diamines of 2 to 12 carbon atoms in the aliphatic radical, eg. ethylenediamine, hexamethylenediamine, octamethylenediamine or 1,2-propylenediamine, whilst examples of suitable cycloaliphatic diamines are those of 6 to 12 carbon atoms, eg. 1,4-diaminocyclohexane. Examples of suitable aromatic diamines are mononuclear and polynuclear aromatic diamines which may or may not be alkyl-substituted, eg. p-phenylenediamine, m-phenylenediamine, p-xylylenediamine, m-xylylenediamine, benzidine and diamines of the general formula

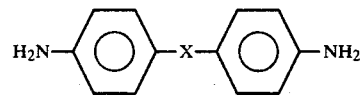

H$_2$N—⟨○⟩—X—⟨○⟩—NH$_2$ where X is —CH$_2$—,

$$-\overset{CH_3}{\underset{CH_3}{C}}-,$$

—O—, —S—,

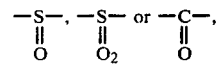

$$-\underset{O}{\overset{}{S}}-, -\underset{O_2}{\overset{}{S}}- \text{ or } -\underset{O}{\overset{}{C}}-,$$

eg. 4,4'-diaminodiphenylmethane, 4,4'-diaminodiphenyl ether, 4,4'-diaminodiphenyl sulfide, 4,4'-diaminodiphenyl sulfone, 4,4'-diaminodiphenyl ketone and mixtures of these.

Preferred components (b) are 4,4'-diaminodiphenylmethane and 4,4'-diaminodiphenyl ether.

(c) According to the invention, this component is an oxadicarboxylic acid or oxadicarboxylic acid ester of the general formula

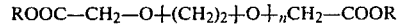

ROOC—CH$_2$—O+(CH$_2$)$_2$+O+$_n$CH$_2$—COOR where R is hydrogen or alkyl of 1 to 6 carbon atoms and n is 0 or an integer from 1 to 10, preferably 0, 1, 2, 3 or 4, or a mixture of these oxadicarboxylic acids or their esters.

Examples of such oxadicarboxylic acids are 3,6-dioxa-octanedi acid (=triglycollic acid) and 3-oxa-pentanedi acid (=diglycollic acid), triglycollic acid (n=1) being preferred, whilst examples of oxadicarboxylic acid esters are dimethyl triglycollate, diethyl triglycollate, dimethyl diglycollate and diethyl diglycollate.

The components (a), (b) and (c) are employed in a molar ratio of (b):(a):(c) = 1:(0.6–1):(0.1–0.6), preferably 1:(0.8–1):(0.2–0.4).

The novel thermosetting polycondensates are obtained by reacting components (a), (b) and (c) in water and/or a water-soluble organic solvent at from 80° to 200° C., preferably from 90° to 150° C.

Suitable water-soluble organic solvents are high-boilers, such as polyhydric alcohols and oxaalcohols, and their partial ethers, eg. ethylene glycol, glycerol, ethylene glycol monomethyl ether, ethylene glycol monoethyl ether, diethylene glycol monomethyl ether, diethylene glycol monoethyl ether, triethylene glycol monomethyl ether and triethylene glycol monoethyl ether, nitrogen-containing compounds, eg. N,N-dimethylformamide, N,N-dimethylacetamide, N-methyl-2-pyrrolidone and N,N-dimethylmethoxyacetamide, and mixtures of these solvents.

In preparing the thermosetting polycondensates, the water-soluble solvents or water can be employed in amounts of from 50 to 200, preferably from 80 to 120, % by weight, based on the total amount of components (a), (b) and (c).

The organic solvents or water present in the preparation of the novel polycondensates can subsequently be completely or partially removed, for example by distillation; alternatively, the solutions obtained from the process of preparation can be employed direct.

A suitable form in which the novel thermosetting polycondensates can be used is a solution in a polar organic solvent, eg. N,N-dimethylformamide, N,N-dimethylacetamide, N-methyl-2-pyrrolidone, N,N-dimethylmethoxyacetamide or a mixture of these solvents. Thus, for example, 35–50% strength solutions of the polycondensates in these solvents can be prepared. A further advantageous use form of the novel thermosetting polycondensates is an aqueous solution or water-dilutable dispersion, which is obtainable by treating the novel resins with aqueous ammonia (the preferred agent) or an organic amine, such as a water-soluble organic tertiary amine, eg. triethylamine, triethanolamine, 2-diethylaminoethanol, methyldiisopropylamine, 3-dimethylaminopropanol etc., at from 50° to 110° C. A useful aqueous solution in general contains from 20 to 70% by weight of a novel thermosetting polycondensate.

Conventional auxiliaries and additives, such as hardeners, for example conventional titanate catalysts, in amounts of from about 0.1 to 5% by weight, based on solid polycondensates, can be added to the solutions of the novel products.

A preferred use of the novel thermosetting polycondensates, containing amide groups and imide groups, is wire enamelling, which is carried out by using the conventional applicators and baking ovens for this process. The oven temperature is in general from 300° to 600° C., and the haul-off speed can be from 4 to 36 m/minute.

The wire enamelling according to the invention can be produced over a wide range of speeds and has excellent resilience and a high softening point, namely 400°–450° C. For example, no cracks in the enamel occur either after stretching the enamelled wire by 20% and coiling it about a wire of the same diameter, or after storing such coiled lengths for 1 hour at 300° C.

Further uses of the novel polycondensates include impregnation, for example of glass mats, and bonding of heat-resistant materials, for example sheeting, webs or paper. In these applications, again, the novel polycondensates, after hardening, exhibit the advantageous properties mentioned above.

In the examples, parts and percentages are by weight, unless stated otherwise.

EXAMPLE 1

78 parts of 1,2,3,4-butanetetracarboxylic acid and 12.3 parts of triglycollic acid are dissolved in 8.3 parts of ethylene glycol and 100 parts of water by heating to 50° C. 66 parts of diaminodiphenylmethane and 16.7 parts of water are then added and the temperature is slowly raised to 130° C. After about 2 hours' reaction time, 132 parts of ethylene glycol and water have distilled off and a homogeneous resin having a viscosity of 38 $mm^2.s^{-1}$ has been produced. 47 parts of the resin are dissolved in 60 parts of N-methylpyrrolidone. A 40% strength solution is obtained, which is used to coat an 0.5 mm thick copper wire in a wire-enamelling machine, the oven being 2.5 m long and operated at 460° C. The properties of the enamelled wire are as follows (i.o. = in order):

| | | | |
|---|---|---|---|
| Enamelling speed (m/minute) | 20 | 22 | 24 |
| Diameter increase (μm) | 30 | 38 | 37 |
| Snap test | i.o. | i.o. | i.o. |
| Breakdown voltage (V/μm) | 279 | 259 | 258 |
| Softening point (°C.) | 450 | 450 | 440 |
| 1 × D coil after 20% prestretching | i.o. | i.o. | i.o. |
| 1 × D coil after 20% prestretching, kept 1 hour at 300° C. | i.o. | i.o. | i.o. |

EXAMPLE 2

187 parts of butanetetracarboxylic acid, 27 parts of diglycollic acid, 25 parts of ethylene glycol, 198 parts of diaminodiphenylmethane and 350 parts of water are introduced into a reaction vessel. The mixture is then warmed to 140° C. After about 4 hours, 357 parts of distillate have passed over at 110° C. A clear, homogeneous resin, having a viscosity of 44 $mm^2.s^{-1}$ is obtained.

(a) A 50% strength solution in N,N-dimethylformamide is prepared from a portion of the resin and is used to enamel 0.5 mm copper wire (oven length 2.5 m; oven temperature 460° C.).

| | | | |
|---|---|---|---|
| Enamelling speed (m/minute) | 20 | 22 | 24 |
| Diameter increase (μm) | 38 | 28 | 28 |
| Snap test | i.o. | i.o. | i.o. |
| Breakdown voltage (V/μm) | 199 | 268 | 318 |
| Softening point (°C.) | 400 | 400 | 395 |
| 1 × D coil after 20% prestretching | i.o. | i.o. | i.o. |
| 1 × D coil after 15% prestretching, kept 1 hour at 300° C. | i.o. | i.o. | i.o. |

(b) A water-based enamel is prepared from a second portion of the resin prepared according to Example 2. To do so, 175 parts of 25% strength aqueous $NH_3$ solution are added dropwise to 200 parts of the resin at 90° C. and the mixture is stirred at this temperature for a further 2 hours. A clear enamel, having a viscosity of 994 mPa.s and a solids content of 53% is obtained. The properties of the product, when used to enamel wire, are identical with those described above.

COMPARATIVE EXAMPLE 351 parts of 1,2,3,4-butanetetracarboxylic acid, 93 parts of ethylene glycol and 500 parts of water are introduced into a reaction vessel and heated to 50° C. When the components have dissolved, 297 parts of diaminodiphenylmethane and 100 parts of water are added and the mixture is then heated to 140° C. After about 4 hours, 605 parts of distillate have passed over and a clear, brittle resin, having a viscosity of 95 mm$^2$.sec$^{-1}$ is obtained. 0.8 mm thick copper wire is enamelled with a solution prepared from 80 parts of resin and 100 parts of N-methylpyrrolidone. The results are as follows:

| Oven temperature (°C.) | 460 | 460 |
|---|---|---|
| Haul-off speed (m/minute) | 5 | 4 |
| Increase in diameter (μm) | 37 | 39 |
| Snap test | i.o. | i.o. |
| Breakdown voltage (V/μm) | 134 | 91 |
| Softening point (°C.) | 340 | 365 |
| 1 × D coil after 10% prestretching | i.o. | i.o. |
| 1 × D coil after 10% prestretching, kept 1 hour at 300° C. | i.o. | i.o. |

We claim:

1. A thermosetting polycondensate, containing amide groups and imide groups, which is obtained by reacting
   (a) 1,2,3,4-butanetetracarboxylic acid or its anhydride with
   (b) one or more aliphatic, cycloaliphatic or aromatic diamines and
   (c) one or more oxadicarboxylic acids or oxadicarboxylic acid esters of the general formula $$ROOC-\!\!\left[CH_2\!-\!O\right]\!-\!(CH_2)_2\!-\!O\!-\!\right]_n CH_2\!-\!COOR$$

where R is hydrogen or an alkyl of 1 to 6 carbon atoms and n is 0 or an integer from 1 to 10, in a water-soluble organic solvent or water at from 80° to 200° C., the components (a), (b) and (c) being employed in a molar ratio of (b):(a):(c)=1:(0.6–1):(0.1–0.6).

2. A polycondensate as described in claim 1, which is dissolved in a polar organic solvent selected from the group consisting of dimethylformamide, dimethylacetamide and N-methylpyrrolidone.

3. A polycondensate as described in claim 1, which is dissolved in water after addition of an aqueous ammonia solution or amine solution.

* * * * *

UNITED STATES PATENT AND TRADEMARK OFFICE
CERTIFICATE OF CORRECTION

PATENT NO. : 4,384,061

DATED : May 17, 1983

INVENTOR(S) : Udo Reiter, Helmut Lehman, Walter Disteldorf and Hans-Uwe Schenck

It is certified that error appears in the above-identified patent and that said Letters Patent is hereby corrected as shown below:

Claim 1, line 10, in the formula, delete the first vertical line following "ROOC".

Signed and Sealed this

Thirtieth Day of August 1983

[SEAL]

Attest:

Attesting Officer

GERALD J. MOSSINGHOFF

Commissioner of Patents and Trademarks